(12) United States Patent
Bittner et al.

(10) Patent No.: US 8,157,289 B2
(45) Date of Patent: Apr. 17, 2012

(54) HINGE FOR AN AIRBAG COVER

(75) Inventors: Martin Bittner, Kalkar (DE); Hartmut Harnisch, Grefrath (DE); Peter Haubach, Nettetal (DE); Johannes Jordan, Nettetal (DE); Martin Lippert, Meerbusch (DE); Albert Roring, Gronau-Epe (DE); Lars Kischa, Wermelskirchen (DE); Michael Grimmelt, Gronau-Epe (DE)

(73) Assignees: Johnson Controls Interiors, Grefrath (DE); K.L. Kaschier und Laminier, Gronau-Epe (DE)

( * ) Notice: Subject to any disclaimer, the term of this patent is extended or adjusted under 35 U.S.C. 154(b) by 655 days.

(21) Appl. No.: 12/293,228

(22) PCT Filed: Mar. 19, 2007

(86) PCT No.: PCT/DE2007/000516
§ 371 (c)(1),
(2), (4) Date: Mar. 19, 2009

(87) PCT Pub. No.: WO2007/110048
PCT Pub. Date: Oct. 4, 2007

(65) Prior Publication Data
US 2009/0217484 A1    Sep. 3, 2009

(30) Foreign Application Priority Data
Mar. 17, 2006  (DE) .................. 10 2006 012 712

(51) Int. Cl.
*B60R 21/215*   (2006.01)

(52) U.S. Cl. .................................... 280/728.3
(58) Field of Classification Search ............. 280/728.3
See application file for complete search history.

(56) References Cited

U.S. PATENT DOCUMENTS

| | | | | |
|---|---|---|---|---|
| 5,362,096 A * | 11/1994 | Satoh et al. | ........... | 280/728.3 |
| 5,378,014 A * | 1/1995 | Cooper | ........... | 280/728.3 |
| 5,407,225 A * | 4/1995 | Cooper | ........... | 280/728.3 |
| 5,427,408 A * | 6/1995 | Ando et al. | ........... | 280/728.3 |
| 5,460,401 A * | 10/1995 | Gans et al. | ........... | 280/728.3 |
| 5,698,283 A * | 12/1997 | Yamasaki et al. | ........... | 428/43 |
| 5,979,931 A * | 11/1999 | Totani et al. | ........... | 280/728.3 |
| 6,753,057 B1 * | 6/2004 | Gardner, Jr. | ........... | 428/43 |
| 7,165,781 B2 * | 1/2007 | Cesar | ........... | 280/728.3 |
| 7,234,726 B2 * | 6/2007 | Trevino et al. | ........... | 280/728.3 |
| 7,380,813 B2 * | 6/2008 | Lanzinger et al. | ........... | 280/728.3 |
| 7,458,604 B2 * | 12/2008 | Hier et al. | ........... | 280/728.3 |
| 7,862,070 B2 * | 1/2011 | Steinke | ........... | 280/728.3 |
| 7,967,330 B2 * | 6/2011 | Kong | ........... | 280/728.3 |
| 2004/0126532 A1 * | 7/2004 | Gardner, Jr. | ........... | 428/43 |
| 2004/0227333 A1 * | 11/2004 | Cesar | ........... | 280/730.1 |

FOREIGN PATENT DOCUMENTS

DE    19948021 A1    4/2001

* cited by examiner

*Primary Examiner* — Drew Brown
(74) *Attorney, Agent, or Firm* — Patricia M. Mathers

(57) ABSTRACT

The invention relates to a hinge for an airbag cover, having a planar textile element as a hinge between the cover of the airbag and an adjacent airbag cover region, for example in the interior of a motor vehicle, and to a region of the planar textile element which faces a carrier of the airbag cover and is embedded in a matrix which is connected to the cover, and a region of the planar textile element which is not embedded in the matrix.

19 Claims, 2 Drawing Sheets

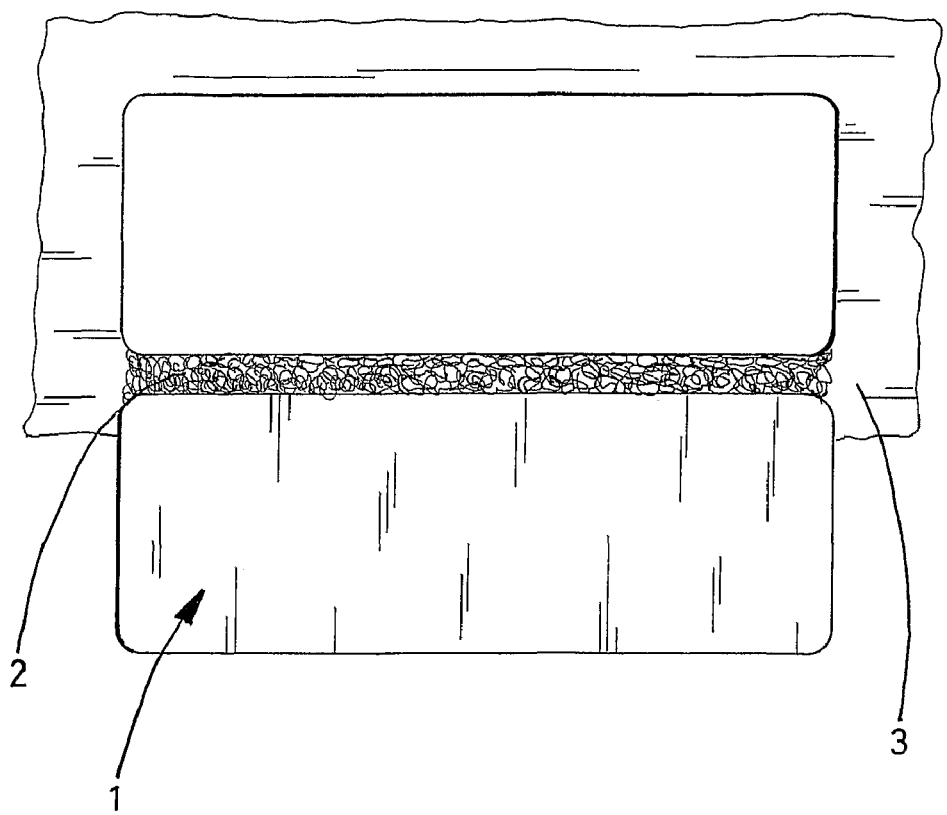
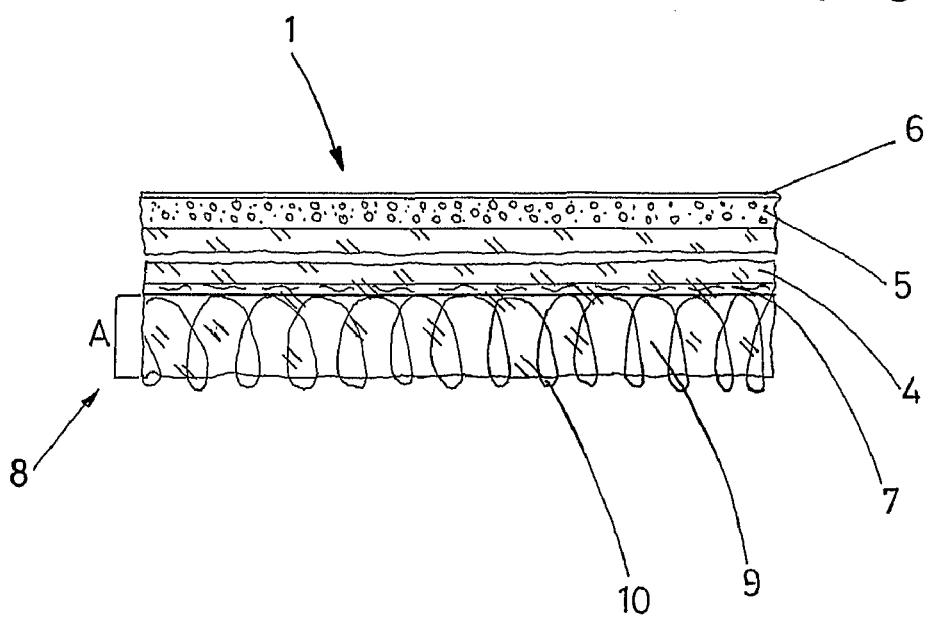

HINGE FOR AN AIRBAG COVER

BACKGROUND INFORMATION

1. Field of the Invention

The invention relates to a hinge for an airbag cover that is used particularly in the interiors of motor vehicles.

2. Description of the Prior Art

Airbag covers are arranged, for example, in dashboards, and cover up the non-deployed airbag arranged beneath them. Airbag covers are also located, for example, in headrests, backrests, and other sites in the interiors of motor vehicles.

When an airbag is triggered during an accident, the opening airbag ("airbag release") exerts pressure on the airbag cover, which then detaches, for example, from the area surrounding the airbag cover in the region of predetermined breaking points and then swings about a hinge, thus opening up space for the opening airbag.

It can be problematic during airbag release, if the airbag cover detaches entirely or partially from the surrounding area, because this may present a risk to persons inside the motor vehicle.

The generic DE 10 2004 010 643 entitled "Trim Panel with Airbag Flap Area", previously disclosed a flexible, two-dimensional element as a hinge between the airbag flap and the airbag flap area. The two-dimensional element has an extra length that typically is used to form a loop, which serves to prevent the airbag cover from detaching from the flap area. This loop serves to prevent, on the one hand, complete detachment of the airbag flap when the airbag flap folds out, and, on the other hand, prevents the airbag flap from closing automatically following the airbag release.

This type of hinge is disadvantageous with regard to manufacturing, because it is very resource-intensive to construct the loop of the two-dimensional textile element in the course of production, and difficult to control its precise positioning. Faulty positioning of the loop, however, can result in a malfunction, when the airbag flap opens during airbag release.

BRIEF SUMMARY OF THE INVENTION

The underlying task of the invention is to construct a hinge for an airbag cover that is, on the one hand, inexpensive and, on the other hand, safe, so that there is no risk of the airbag cover uncontrollably detaching from its surrounding area, either entirely or partially, during airbag release.

This underlying task of the invention is achieved by the teachings of the independent claim.

In other words, a hinge for the airbag cover is proposed, wherein the hinge is essentially a two-dimensional textile element that is embedded partially into the structure of the airbag-cover carrier or into a component connected to the carrier. A first part of the two-dimensional textile element may be embedded into the carrier, for example, by injection, back injection, back-compression molding, casting, or injecting foam. A second part of the two-dimensional textile element is not, or is only partially, embedded in this structure. During the swinging motion of the cover during airbag release, the two-dimensional textile element at least partially, and possibly also fully, loosens or detaches from the matrix, for example, of the airbag-cover carrier, and in so doing, absorbs forces pressing against the airbag cover. As the cover continues to swing open, remaining forces are absorbed over the surface of the two-dimensional textile element, due to its ability to expand or stretch.

Advantageous embodiments of the invention are explained in the dependent claims.

In an advantageous embodiment, the matrix is constructed as a single piece together with the airbag-cover carrier. The two-dimensional textile element, can, for example, be directly foamed, back-injected, injected, back-compression molded, or cast simultaneously with the carrier in such a way that a lower part of the two-dimensional textile element i.e., a portion of the two-dimensional textile element that is closer to the outer side of the cover, is fully embedded into the mass of material forming the carrier in the manufacturing process of the carrier, while another area, i.e., a portion of the two-dimensional textile element that faces away from the outer side of the cover, remains free. By coating the two-dimensional textile element, for example, one can intentionally prevent or control the depth of penetrating flow of the molten material forming the carrier through the two-dimensional textile element.

In an advantageous embodiment, the matrix that receives the two-dimensional textile element can also be constructed as a component separate from the airbag-cover carrier, so that this component can be manufactured first together with its matrix and then subsequently connected to the carrier in an additional processing step.

In an advantageous embodiment, the matrix may be made of a plastic that cures, for example, can be made from diverse thermoplastics such as, for example, polypropylene, ABS, or similar materials, so as to enable especially easy and cost-effective manufacturability of the airbag cover.

In an advantageous embodiment, the area of the two-dimensional textile element embedded in the matrix amounts to at least one-half the thickness of the two-dimensional textile element, and tests have shown that embedding 50% to 95% of the two-dimensional textile element produces excellent results.

In an advantageous embodiment, the two-dimensional textile element is constructed as a knitted fabric, which has the advantage of having a high degree of structural expansion or stretchability, over the entire textile surface. The ability to expand or stretch means that the two-dimensional textile element is well able to absorb the forces that are generated during airbag release and that are, for example, exerted on the hinge. The two-dimensional textile element can thus absorb the forces into the carrier matrix, particularly when a knitted fabric is used that has high multi-axial or multi-directional structural expansion.

An advantageous embodiment is also achieved then, when, instead of a knitted fabric, a woven fabric is used as the two-dimensional textile element, the entire surface of which, according to the independent claim, can be embedded into the corresponding matrix, although with only partial penetration of the carrier material through the two-dimensional textile element.

In an advantageous embodiment, the two-dimensional textile element can be a folded construction, such that, when looking at the folds in a cross-sectional view, the lower portion of the folds, i.e., that portion that is closer to the outer side of the airbag cover, are embedded in the respective matrix, for example, in the material for the airbag-cover carrier, and an upper portion of the folds, for example, the folds crests, are arranged outside of this embedded area.

The two-dimensional textile element can, for example, be made of polyester or polyamide material, which exhibits such a high resistance to heat that the area embedded in the matrix maintains sufficient temperature consistency, so that, for example, during the back-injection, injection, back-compression molding, casting, or foaming process, it will maintain its advantageous properties even after being embedded.

In an advantageous embodiment, the two-dimensional textile element is constructed as a multi-axial textile element, i.e., an element that stretches in multiple directions. This means that the two-dimensional textile element is able to absorb across its entire surface a great portion of the forces that are exerted when the hinge swings open.

A cost-effective way to manufacture the proposed hinge is possible by providing a barrier effect on the side of the two-dimensional textile element that faces the airbag-cover carrier, the barrier effect providing a higher resistance, for example, to flow-through or penetration of the molten material for the airbag-cover carrier, than the two-dimensional textile element itself.

This flow-through-altering layer or barrier of the two-dimensional textile element makes it possible to control the amount of the molten material that flows through the two-dimensional textile element. By not allowing the molten material to flow through the two-dimensional textile element completely, it is possible to achieve a configuration in which the lower portion or lower coating that is toward the matrix of the airbag cover is completely embedded in the matrix material, whereas a portion of the two-dimensional textile element that is facing away from the carrier is only partially or not at all embedded in the matrix material.

This flow-through-altering layer or barrier can, for example, be formed by applying a coating to one side of the two-dimensional textile element. It is also possible to define various areas having different flow resistances to the molten masses, for example, in the area of the two-dimensional textile element, whereby the area having a higher flow-through resistance faces the airbag-cover carrier.

BRIEF DESCRIPTION OF THE DRAWINGS

Embodiments of the invention are shown in the drawings.

FIG. 1 illustrates an airbag cover opened after airbag release.

FIG. 2 shows in a larger-scale cross-section a first embodiment of a coated two-dimensional textile element embedded in the area of the airbag-cover hinge.

DETAILED DESCRIPTION OF THE INVENTION

Figure 3:
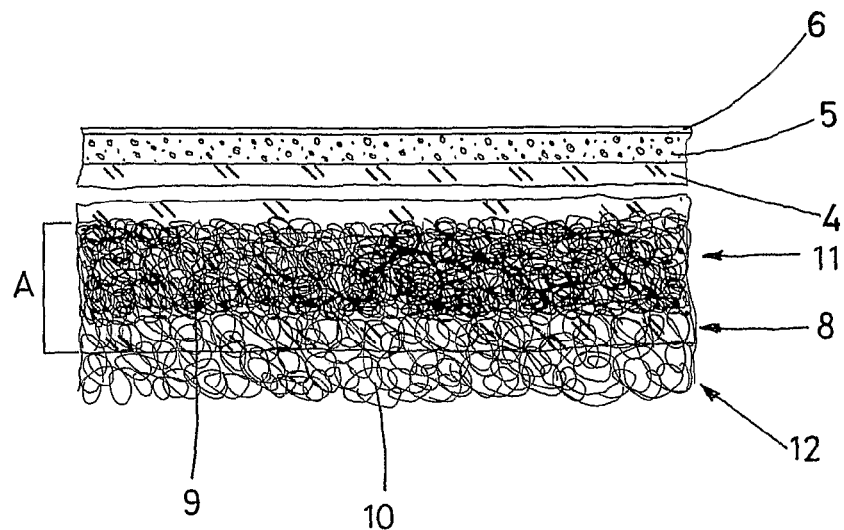
FIG. 3 shows in a larger-scale illustration an additional embodiment of a two-dimensional textile element embedded in the area of the hinge for the airbag cover.

FIG. 1 illustrates an airbag cover 1, which, in this drawing, is opened and connected by a hinge 2 to a surrounding area 3 of the airbag cover. The surrounding area 3 is part of, for example, a dashboard, a headrest, an armrest of a motor vehicle seat, a column, vehicle interior trim paneling, etc. An undeployed airbag is stored behind the airbag cover 1. The airbag itself is not shown in the drawings.

When the airbag cover 1 opens, it swings about the hinge 2 into the interior space of the vehicle and opens up a path that allows the inflating airbag to expand into the interior of the vehicle. The hinge 2 absorbs a portion of the forces exerted on the airbag cover 1, which prevents the cover from opening in an uncontrolled manner. This minimizes the risk that the airbag cover 1 will detach from the surrounding area 3 and put persons sitting in the vehicle at risk of injury from the cover 1.

FIG. 2 is a cross-sectional view of the hinge portion of the airbag cover 1. The airbag cover 1 in the area of the hinge 2 is constructed from a carrier 4 that may be made of a plastic material, particularly a thermoplastic material such as polypropylene. A coating of foam 5 is applied to the carrier 4 on the side facing the interior of the vehicle and a decorative covering 6 then applied to the surface of the foam, so as to fashion a visually attractive interior of the vehicle.

In this embodiment, the illustration of the carrier 4 is interrupted, because the depth or thickness of the carrier 4, preferably 2-3 mm, depends upon the respective size of the airbag cover 1. In this embodiment, a layer 7 is provided on the side of the carrier 4 facing away from the decorative covering 6. The layer can be constructed, for example, as a coating side. A two-dimensional textile element 8 is arranged on the side of the layer 7 facing away from the carrier 4. In this embodiment, the two-dimensional textile element 8 is constructed as a knitted fabric.

The layer 7 is provided as a flow- or penetration-inhibiting layer that limits the flow or penetration into the layer 7 of the molten thermoplastic material that forms the carrier 4, i.e., layer 7 has a higher level of flow resistance than the two-dimensional textile element 8, so that the penetration depth "A" of the two-dimensional textile element 8 to the thermoplastic material forming the carrier 4 can be precisely adjusted.

In this embodiment, layer 7 is made of a fleece. After the thermoplastic material used in this embodiment is hardened, the two-dimensional textile element 8 is thus embedded across the area of the penetration depth A, that is, the penetration depth A characterizes the matrix 9 in which the two-dimensional textile element 8 is embedded. On the side of the matrix 9 facing away from the carrier 4, there is a "free area" 10 of the two-dimensional textile element 8. This free area 10 is not part of the embedded two-dimensional textile element 8.

Instead of the fleece used in the embodiment according to FIG. 2 (which, for example, can be polyester), a perforated film or other similar flow-resistant materials can be used as the coating materials, which achieve a uniform penetration depth when a curable mass penetrates the two-dimensional textile element.

FIG. 3 illustrates a carrier 4, which is, on the other hand, covered with foam 5, as well as a finishing decorative skin 6, on the side facing the interior of a motor vehicle. In this embodiment, an additional layer 7 or coating side is not used. Instead, the two-dimensional textile element 8 has an area 11 facing the carrier 4 that creates a higher flow resistance than a "looser" area 12 facing away from the carrier 4, which has a lower flow resistance than area 11. As shown in the embodiment according to FIG. 2, a non-embedded, free area 10 of the two-dimensional textile element 8 is also provided here. The area of the coated two-dimensional textile element 8 that is embedded into the matrix of the carrier 4 is designated by 9.

In an advantageous embodiment, due to the barrier effect of the coated two-dimensional textile element, for example, more than 50% (as shown in the vertical direction in the illustration) of the thickness of the two-dimensional textile element 8 is included in the embedded area, and less than 50% of the two-dimensional textile element 8 belongs to the "free", non-embedded area 10 of the same. In an advantageous embodiment, approximately 70 to 80% of the two-dimensional textile element is embedded. Naturally, a corresponding variation of the ratio of embedded area to free area can be provided, depending upon the application, that is, upon the force that an expanding airbag exerts on the airbag cover, and, depending upon the weight and size of the airbag cover, as well as upon the length of the outward swing of the airbag cover.

If a large portion of the two-dimensional textile element is embedded in the matrix of the carrier 4, then a greater portion of the occurring forces can be absorbed by this hinge.

In addition to the illustrated knitted fabrics, the two-dimensional textile element can also be constructed as woven fabric, whereby an advantageous adjustment of the free area that is not embedded can then be achieved, if the woven fabric has sufficient thickness, such as is customary, for example, for knitted fabrics. Naturally, as described above, the woven fabric can also be coated.

Likewise, a two-dimensional textile element, such as, for example, a woven fabric that has a folded construction can be used, so that, for example, the folded areas adjacent the carrier 4 are embedded and the "fold crests" facing away from the carrier are exposed, i.e., not embedded.

Figure 4:
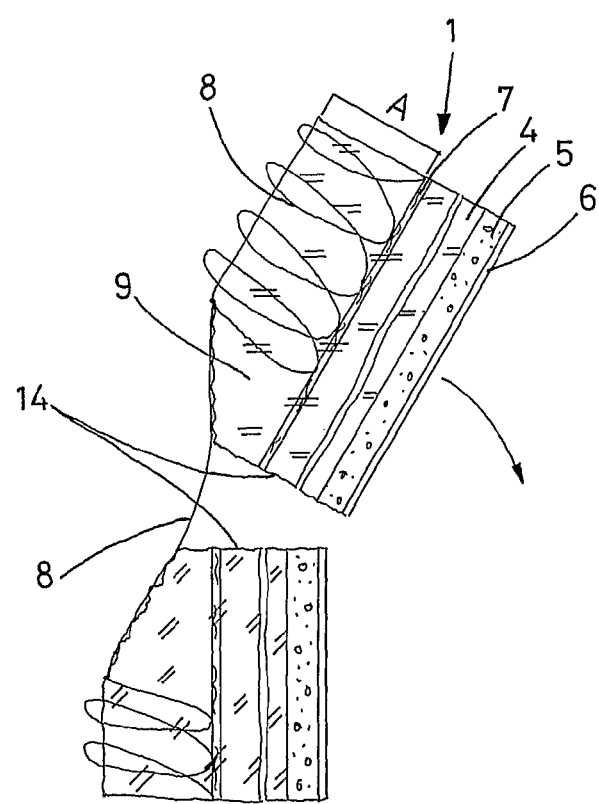
FIG. 4 shows a larger-scale cross-section of the hinge of an airbag cover, as it is opening during airbag release.

With reference to FIG. 4, the hinge area of an airbag cover is illustrated in an oversize illustration, that is, the airbag cover is swung in the direction of the arrow toward the motor vehicle interior. The number 14 designates a predetermined breaking point that represents a weakening and which is used to define the site of the swinging motion of the airbag cover 1. The swinging open of the airbag cover 1 causes the carrier material 4 to break. The cover 1 swinging open even farther causes the two-dimensional textile element to detach, loosen, or stretch in a pre-defined manner, up into the inside of the carrier matrix 4. A great portion of the occurring forces is thereby absorbed over the entire surface by the structural expansion and by the component strength of the carrier matrix.

The area of the two-dimensional textile element in which the material for the carrier does not flow delaminates up into the inside of the adjacent carrier matrix. Thus, the structural expansion over the entire surface of the two-dimensional textile element and its embedding into the carrier serve to absorb the occurring forces into the carrier matrix, and this results in an outward swinging motion of the airbag cover 1.

Residual forces cause an additional swinging open of the airbag cover 1, and these residual forces are initially received and absorbed over the entire surface by the textile expandability of the two-dimensional textile element, i.e., particularly of a knitted fabric, so that, for one, the airbag cover opens in a controlled manner and is in no danger of being torn from its surrounding environment.

One advantage of the proposed hinge is that a particularly lightweight two-dimensional textile element 8 can be used, so that the weight of the hinge 2 can be kept very low. Because of this, it is not necessary that the hinge be a heavy metal hinge, for example, which is cost-intensive to produce. Because the weight of the hinge 2 can be kept low, the forces that occur are also lower than would be the case with a heavier cover for the airbag.

Furthermore, the proposed hinge 2 for the airbag cover also enables a cost-effective manufacturing process, because the hinge 2 can be manufactured together with the airbag cover 1. In other words, the two-dimensional textile element 8 of the hinge 2 can be embedded into the carrier matrix (partially), at the time the carrier is manufactured.

The invention claimed is:

1. A hinge for an airbag cover comprising:
an airbag-cover carrier;
an airbag cover that is attached to the airbag-cover carrier;
a matrix that is provided on the airbag-cover carrier; and
a two-dimensional textile element constructed as a folded element with fold crests on a first side and on a second side;
wherein the first side of the two-dimensional textile element is affixed to the airbag-cover carrier and the second side is affixable to an area near the airbag cover; and
wherein the first side is embedded in the matrix and the second side is not embedded in the matrix.

2. The hinge of claim 1, wherein the matrix is constructed as a single piece together with the airbag-cover carrier.

3. The hinge according to claim 1, wherein the matrix is constructed as a component separate from the airbag-cover carrier.

4. The hinge according to claim 1, wherein the matrix is a hardened plastic material.

5. The hinge according to claim 1, wherein a distance between the first side and the second side is a thickness dimension of the two-dimensional textile element and wherein the first side that is embedded in the matrix encompasses at least one-half of the thickness dimension.

6. The hinge according to claim 1, wherein the two-dimensional textile element is a knitted fabric.

7. The hinge according to claim 1, wherein the two-dimensional textile element is a woven fabric.

8. The hinge according to claim 1, wherein the two-dimensional textile element is made of a synthetic material.

9. The hinge according to claim 1, wherein the two-dimensional textile element is constructed of a stretch fabric.

10. The hinge according to claim 9, wherein the stretch fabric stretches in multiple directions.

11. The hinge according to claim 1, further comprising a flow-through resistance layer that is disposed between the airbag cover and the two-dimensional textile element, wherein the flow-through resistance layer has a higher flow-through resistance to molten material for forming the carrier than the two-dimensional textile element.

12. The hinge according to claim 11, wherein the flow-through resistance layer is a component separate from the two-dimensional textile element.

13. The hinge according to claim 12, wherein the flow-through resistance layer is a coating applied to the two-dimensional textile element.

14. The hinge according to claim 11, wherein the flow-through resistance layer is connected to the two-dimensional textile element.

15. The hinge according to claim 11, wherein the flow-through resistance layer is a fleece.

16. A hinge for an airbag cover comprising:
an airbag-cover carrier;
an airbag cover that is attached to the airbag-cover carrier;
a two-dimensional textile element having a first side that is affixed to the airbag-cover carrier and a second side that is affixable to an area near the airbag cover; and
a flow-through resistance layer that is disposed between the airbag cover and the two-dimensional textile element, wherein the flow-through resistance layer has a higher flow-through resistance to molten material for forming the carrier than the two-dimensional textile element.

17. The hinge according to claim 16, wherein the flow-through resistance layer is a component separate from the two-dimensional textile element.

18. The hinge according to claim 16, wherein the flow-through resistance layer is a coating applied to the two-dimensional textile element.

19. The hinge according to claim 16, wherein the flow-through resistance layer is connected to the two-dimensional textile element.

* * * * *